(12) United States Patent
Beauquis

(10) Patent No.: US 10,735,600 B2
(45) Date of Patent: Aug. 4, 2020

(54) QUALITY MONITORING ARRANGEMENT AND METHOD IN AN INDUSTRIAL PRINTER SYSTEM

(71) Applicant: Dover Europe Sàrl, Vernier (CH)

(72) Inventor: Stéphane Beauquis, Chateaudouble (FR)

(73) Assignee: Dover Europe Sàrl (CH)

( * ) Notice: Subject to any disclaimer, the term of this patent is extended or adjusted under 35 U.S.C. 154(b) by 176 days.

(21) Appl. No.: 15/778,391

(22) PCT Filed: Oct. 7, 2016

(86) PCT No.: PCT/EP2016/073946
§ 371 (c)(1),
(2) Date: May 23, 2018

(87) PCT Pub. No.: WO2017/089019
PCT Pub. Date: Jun. 1, 2017

(65) Prior Publication Data
US 2018/0359371 A1 Dec. 13, 2018

Related U.S. Application Data

(60) Provisional application No. 62/259,134, filed on Nov. 24, 2015.

(51) Int. Cl.
*H04N 1/00* (2006.01)

(52) U.S. Cl.
CPC ....... *H04N 1/00005* (2013.01); *H04N 1/0005* (2013.01); *H04N 1/00015* (2013.01);
(Continued)

(58) Field of Classification Search
CPC .......... H04N 1/00005; H04N 1/00015; H04N 1/00029; H04N 1/0005; H04N 2201/0082;
(Continued)

(56) References Cited

U.S. PATENT DOCUMENTS

2004/0021903 A1* 2/2004 Wanda ............... H04N 1/32529
358/1.15
2006/0203257 A1* 9/2006 McLuckie ............. G06F 3/1204
358/1.1
(Continued)

FOREIGN PATENT DOCUMENTS

CN 102555443 A 7/2012
CN 102629088 A 8/2012
(Continued)

OTHER PUBLICATIONS

International Search Report in PCT/EP2016/073946, dated Jan. 2, 2017, 4 pages.

*Primary Examiner* — Yon J Couso
(74) *Attorney, Agent, or Firm* — Lerner, David, Littenberg, Krumholz & Mentlik, LLP

(57) ABSTRACT

The embodiments herein relate to a method performed by an image capturing device for handling printed information on an information carrier. The image capturing device dynamically determines at least part of print information that should be printed on the information carrier by an industrial printer. When the print information has been printed on the information carrier by the industrial printer, the image capturing device captures an image of at least part of the print information on the information carrier.

20 Claims, 11 Drawing Sheets

(52) U.S. Cl.
CPC ..... *H04N 1/00029* (2013.01); *H04N 1/00042* (2013.01); *H04N 1/00068* (2013.01); *H04N 1/00082* (2013.01); *G06T 2207/30144* (2013.01); *H04N 2201/0082* (2013.01)

(58) Field of Classification Search
CPC ........... H04N 1/00042; H04N 1/00082; H04N 1/00068; G06T 2207/30144
See application file for complete search history.

(56) References Cited

U.S. PATENT DOCUMENTS

| | | | |
|---|---|---|---|
| 2009/0262661 A1* | 10/2009 | Ueda | H04N 1/00291 370/254 |
| 2012/0147413 A1 | 6/2012 | Giess | |
| 2013/0301083 A1 | 11/2013 | Kaneda | |
| 2014/0056484 A1 | 2/2014 | Lotz et al. | |

FOREIGN PATENT DOCUMENTS

| | | |
|---|---|---|
| CN | 104943403 A | 9/2015 |
| WO | 2014/108460 A2 | 7/2014 |

* cited by examiner

QUALITY MONITORING ARRANGEMENT AND METHOD IN AN INDUSTRIAL PRINTER SYSTEM

CROSS-REFERENCE TO RELATED APPLICATIONS

The present application is a national phase entry under 35 U.S.C. § 371 of International Application No. PCT/EP2016/073946 filed Oct. 7, 2016, published in English, which claims priority from U.S. Provisional Patent Application No. 62/259,134 filed Nov. 24, 2015, all of which are incorporated herein by reference.

TECHNICAL FIELD

Embodiments herein relate to industrial printers. In particular, embodiments herein relate to an industrial printer and method therein for printing information on at least one information carrier and verifying the print information. Embodiments herein also relate to an image capturing device for verifying the printed information. Embodiments herein also relate to computer program products for verifying the printed information on at least one information carrier.

BACKGROUND

In an industrial printer system, a printer is typically configured to print different types of information on various types of information carriers, such as items, products or articles. One example of an operation of such a printer is the printing of print information on various types of packages or consumer goods. Commonly, such packages or consumer goods require a great deal of product identifications and content specifications, such as, for example, traceability data, serial numbers, time and dates of packaging, expiry dates, etc. Therefore, the print information to be printed on the package or consumer goods may vary from one item to the next in a batch of items, from one batch of items to another, from one site of manufacture to another, from one time of manufacture to another, from one type of print technology to another, etc.

The term industrial in industrial printer and industrial printer system may refer to that it is related to or characterized by industry, that it is designed or suitable for use in industry. Industry may be described as the process of making products by using machinery and factories.

The print information may comprise both print information data and print information instructions. The print information data may comprise, for example, references to printer ready bitmap images, such as, e.g. barcodes, or the print ready information to be printed as is; while the print information instructions on the other hand may comprise, for example, code algorithms for the printer to determine print information data on-the-fly, i.e. as it is being printed, such as, e.g. incremental enumerations, or coded instructions indicating how the print information data is to be printed on the information carrier. This print information also conforms into a specific print information format.

It is often desired to verify that a code or information has been printed for several reasons: whether the correct information is printed, whether the information is printed in a visual and intangible form, if the industrial printer malfunctions, for example, an operator is notified to fix the malfunction, etc. In order to verify that a code or information has been printed on an information carrier, an image capturing device such as e.g. a camera may capture an image of the print information.

Today, it is possible to verify the presence of print information, i.e. that something has been printed. Today, the industrial printer knows what print information it should print on the information carrier (both static and dynamic print information). The industrial printer may also be the one that calculates at least part of the print information (e.g. the dynamic part). The industrial printer provides the image capturing device with information about the print information so that the image capturing device knows what information to expect on the information carrier. After the industrial printer has printed the print information on the information carrier, the image capturing device (which works in a batch mode) captures an image of the print information in order to verify the presence of the print information. The term batch mode is used in manufacturing to denote that a number of produced items or goods are part of the same batch, e.g. produced from the same raw material(s) and with the same manufacturing setup so that they can be considered to have the same qualities.

An example method of the current method in a printer system will now be described with reference to FIG. 1 and FIG. 2. FIG. 1 illustrates an example of the printer system. The printer system illustrated in FIG. 1 comprises an industrial printer 101 and an image capturing device 105. The industrial printer 101 and the image capturing device 105 are adapted to communicate with each other. In addition to being adapted to capture an image, the image capturing device 105 may be adapted to process the captured image. An information carrier 107 travels on a conveyor belt 110 in the direction of the arrow in FIG. 1. When the information carrier 107 travels on the conveyor belt 110 it first passes the industrial printer 101 and then the image capturing device 105. In some embodiments, the image capturing device 105 may be collocated with a processing device. The method in FIG. 2 comprises at least some of the following steps, which steps may be performed in any suitable order than described below:

Step 201

Based on a trigger, the industrial printer 101 determines print information which is to be printed on the information carrier 107.

Step 202

When the information carrier 107 passes the industrial printer 101, the industrial printer 101 prints the print information which was determined in step 201 on the information carrier 107. As seen in the example in FIG. 1, the information carrier 107 may travel on a conveyor belt.

Step 203

The industrial printer 101 sends information about the print information to an image capturing device 105. Step 203 may be performed after step 201 or after step 202.

Step 204

The image capturing device 105 receives and stores the print information. The image capturing device 105 now has knowledge about what information the industrial printer 101 has or is going to print on the information carrier 107.

Step 205

The image capturing device 105 captures an image of the print information on the information carrier 107 when the information carrier 107 enters the field of view of the image capturing device 105.

Step 206

The image capturing device 105 may process the captured image by for example comparing the captured image with the print information which it received from the industrial printer 101 in step 204. In some embodiments, the processing of the captured image may be performed by a standalone processing device (not shown in FIG. 2, but illustrated in FIG. 3). In such embodiment, the image capturing device 105 may transmit the captured image to the image processing device for processing. After processing, the image processing device may send information about the result of the processing to the image capturing device 105, i.e. whether the print information is correct or incorrect.

Step 207

If the result of the processing in step 206 indicates that the print information is incorrect, the image capturing device 105 may determine to reject the information carrier which carries the print information. The image capturing device 105 may send instructions to e.g. a rejection device to reject the information carrier 107. That the print information is incorrect may involve that parts of or the complete print information may be missing, that parts or the complete print information does not correspond to what the industrial printer 101 determined in step 201, that there are issues with the quality of the print information (e.g. the print information is unreadable or inaccurate) etc.

Steps 201-207 in FIG. 2 are repeated until the end of the batch of information carriers 107.

The current method can handle cases where parts of the codes are missing on a product, when there are issues with the quality of the code or when the code information is inaccurate due to e.g. an operator mistake. However, this requires the print information to be sent from the industrial printer 101 to the image capturing device 105 for every print, or for the print information to be sent from the image capturing device 105 to the industrial printer 101 for every print and to compare that the results from the industrial printer 101 and image capturing device 105 are matching. This solution is limited to the information transfer speed between the industrial printer 101 and the image capturing device 105.

SUMMARY

It is an object of embodiments herein to increase the reliability of the print information being printed on an information carrier.

According to a first aspect of embodiments herein, the object is achieved by a method performed by an image capturing device for handling printed information on an information carrier. The image capturing device dynamically determines at least part of print information that should be printed on the information carrier by an industrial printer. When the print information has been printed on the information carrier by the industrial printer, the image capturing device captures an image of at least part of the print information on the information carrier.

According to a second aspect of embodiments herein, the object is achieved by an image capturing device for handling printed information on an information carrier, the image capturing device is adapted to dynamically determine at least part of print information that should be printed on the information carrier by an industrial printer. The image capturing device is adapted to capture, when the print information has been printed on the information carrier by the industrial printer, an image of the print information of at least part of the information carrier.

According to a third aspect of embodiments herein, the object is achieved by a method performed by a print system for handling printed information on an information carrier. The industrial printer dynamically determines at least part of print information that should be printed on the information carrier by the industrial printer. An image capturing device dynamically determines at least part of print information that should be printed on the information carrier by the industrial printer. The industrial printer prints the print information on the information carrier. When the print information has been printed on the information carrier by the industrial printer, the image capturing device captures an image of the print information on the information carrier.

According to a fourth aspect of embodiments herein, the object is achieved by a print system adapted to handling printed information on an information carrier. The print system comprises an industrial printer which is adapted to dynamically determine at least part of print information that should be printed on the information carrier by the industrial printer. The print system further comprises an image capturing device adapted to dynamically determine at least part of print information that should be printed on the information carrier by the industrial printer. The industrial printer is further adapted to print the print information on the information carrier. The image capturing device is further adapted to, when the print information has been printed on the information carrier by the industrial printer, capture an image of the print information on the information carrier.

According to a fifth aspect of embodiments herein, the object is achieved by a first computer program product for handling printed information on an information carrier. The first computer program product comprising instructions which, when executed on at least one processor of an image capturing device, cause the image capturing device to:

dynamically determine at least part of print information that should be printed on the information carrier;

capture an image of the print information on the information carrier; and to verify whether at least part of the print information on the captured image is substantially the same as at least part of the determined print information.

According to a sixth aspect of embodiments herein, the object is achieved by a second computer program product for handling printed information on an information carrier. The second computer program product comprising instructions which, when executed on at least one processor of a print system, cause the print system to:

dynamically determine, at the industrial printer, at least part of print information that should be printed on the information carrier by the industrial printer;

dynamically determine, at an image capturing device, at least part of print information that should be printed on the information carrier by the industrial printer;

print, at the industrial printer, the print information on the information carrier; and to when the print information has been printed on the information carrier by the industrial printer, capture an image of the print information on the information carrier with the image capturing device.

Since image capturing device is able to dynamically determine at least part of print information that should be printed on the information carrier by an industrial printer, the reliability of the print information being printed on an information carrier is increased.

Embodiments herein afford many advantages, of which a non-exhaustive list of examples follows:

Since the industrial printer and the image capturing device both dynamically determines the print information to be printed, the embodiments herein are not dependent on a real time communication between the industrial printer and the image capturing device. Another advantage of the embodiments herein is that they are resilient to network communication delays and communication faults.

The embodiments herein are not limited to the features and advantages mentioned above. A person skilled in the art will recognize additional features and advantages upon reading the following detailed description.

BRIEF DESCRIPTION OF THE DRAWINGS

Reference is made to the attached drawings, wherein elements having the same reference number designation may represent like elements throughout.

The figures are schematic and simplified for clarity, and they merely show details for the understanding of the embodiments presented herein, while other details have been left out.

DETAILED DESCRIPTION

Figure 3:
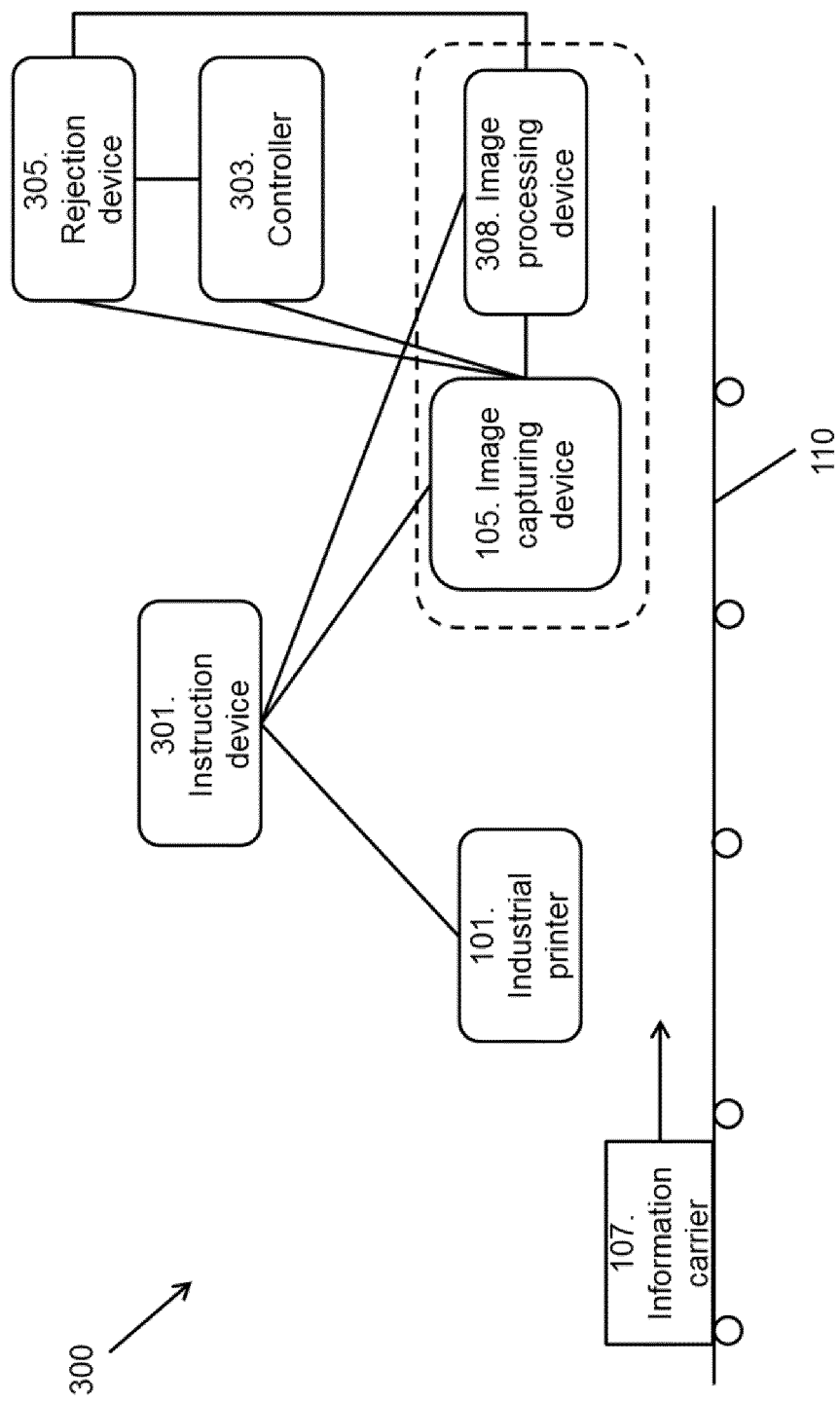
FIG. 3 is a signalling diagram illustrating embodiments of a printer system.

FIG. 3 illustrates an example of an industrial printer system 300. The industrial printer system 300 comprises at least one of the following entities: an industrial printer 101, an image capturing device 105, an instruction device 301, a controller 303, a rejection device 305 and an image processing device 308. FIG. 3 also illustrates the information carrier 107 which travels on the conveyor belt 110 in the direction indicated by the arrow. The information carrier 107 and the conveyor belt 110 may also be seen as comprised in the industrial printer system 300. The conveyor belt 110 may also be referred to as a transportation band. The information carrier 107 may be for example an item, a product or an article. The dotted box around the image capturing device 105 and the image processing device 308 illustrates that they may be two separate and standalone devices, or that they may be collocated in one device. When they are collocated, it may be described as the image processing device 105 is adapted to perform the processing.

The industrial printer 101 may be of any suitable type such as for example an ink-jet printer, a digital printer, a thermal transfer printer, a print and apply printer or a laser printer. The ink-jet printer may be for example a thermal ink-jet printer, a continuous ink-jet printer, a hot melt ink-jet printer, a liquid ink-jet printer or a valve ink-jet printer. The industrial printer 101 may be adapted to perform black & white printing, colour printing or both black & white and colour printing. The industrial printer 101 is adapted to print information on at least one information carrier 107. The industrial printer 101 is adapted to determine at least part of the print information which it prints on the information carrier 107. In some embodiments, a print design device (not shown in FIG. 3) is adapted to determine at least part of the print information, and then provide the industrial printer 101 with the determined part of the print information. For example, the print design device may determine a static part of the print information which indicates which factory the information carrier 107 is produced in (the factory information is the same on each information carrier 107), and the industrial printer 101 may dynamically determine the serial number of each information carrier 107. The print design device and the industrial printer 101 may be directly connected to each other or via a communication network, such as e.g. a Local Area Network (LAN) or a Wireless LAN (WLAN). The print design device may also be referred to as an instruction device 301. The instruction device 301 is described in more detail later.

The print information may be for example a number of time instances (time, date, or time and date represented in an encoding), serial number instances, or a free text etc. The time and date may also be a post date (expiry date or best before date) e.g. today's date+20 days.

The time may also comprise a custom code, a shift code, or both a shift and a custom code. The custom code may be for example that the month January can be printed as A, February as B, . . . or any entered free text. The shift code may be used to for example divide the day (and week) into two different shifts, e.g. shift A is between 06.00 h-12.00 h, shift B is between 12.00 h-18.00 h and shift C is between 18.00 h and 06.00 h. The shifts can be represented by any free text entered in the configuration. The shift code may be an alphabetic character, a numeric character or both alphabetic and numeric characters. The industrial printer 101 may then use these tables with custom code for printing.

The dynamic print information may also be generated from an algorithm, where the code to be printed is computed for each print. The print information may also be transposed from a value to another using a transpose table (custom time and date). The print information may be in a standard format or a customized format, or the information may be encoded or calculated through an algorithm. The algorithm may be a mathematical expression or a computer algorithm. The dynamic print information may comprise alphabetic characters, numeric characters or a combination of alphabetic and numeric characters. The dynamic print information may also be obtained from a queue of data.

At least one image capturing device 105 is adapted to capture an image of at least part of the print information after it has been printed on the information carrier 107 by the printer 101. The image capturing device 105 may be a camera, a scanner or any other suitable device adapted to capture images. For example, there may be one image capturing device 105 located with reference to the information carrier 107 and the conveyor belt 110 so that it can capture an image of at least part of the print information on the information carrier 107. In another example, a plurality of image capturing devices 105 is comprised in the printer system 300. In such example, the plurality of image capturing devices 105 are located in different angles and positions with respect to the information carrier 107 and the conveyor belt 110. Thus, each of the plurality of image capturing devices 105 captures a respective image of the information carrier 107 in different angles. Together, the images from each of the plurality of image capturing devices 105 form a complete image of the information carrier 107, e.g. an image of 360° of the information carrier 107. Only one image capturing device 105 is illustrated in FIG. 3 for the sake of simplicity.

The image capturing device 105 may be time synchronized with the industrial printer 101. The image capturing device 105 and the industrial printer 101 may each comprises a clock, and these clocks may be time synchronized. The time synchronizing may be performed by or triggered by the instruction device 301. The instruction device 301 may send time information such as e.g. the date and time to the image capturing device 105. This may be done by sending e.g. the string YYYY-MM-DDTHH:MM:SS to the image capturing device 105, where YYYY represents the year, MM represents the month, DD represents the day, T represents the separation between the date and the time, HH represents the hour, MM represents the minute and SS represents the second. A hidden merge field may be comprised in the print information, and this hidden merge field may be synchronized with the right symbolic tag in the image capturing device 105.

As mentioned earlier, the image capturing device 105 and the image processing device 308 may be collocated, i.e. the image capturing device 105 is adapted to perform the processing. The image capturing device 105 may be adapted to analyse and process the captured image in order to verify whether the print information in the captured image is substantially the same as the determined print information. This may be done by comparing the print information seen on the captured image with the print information which was determined by the image capturing device 105. As also mentioned earlier, the image capturing device 105 and the image processing device 308 may be separate and standalone devices. In such example, the image capturing device 105 is adapted to send the captured image to the image processing device 308 which analyses and processes the captured image. In the example with a plurality of image capturing devices 105, each of the image capturing devices 105 may be adapted to analyse and process their captured images, or each of the image capturing devices 105 may send their captured images to the common image processing device 308 which collects and processes the respective images together in view of the print information. The image processing device 308 may be adapted to communicate with the controller 303 or with both the controller 303 and the rejection device 305.

The controller 303 may be adapted to reject the information carrier 107 if at least part of the determined print information is not substantially the same as at least part of the print information on the captured image. The controller 303 may receive instructions from the image capturing device 105 to reject the information carrier 107. The controller 303 may then send a rejection command to the rejection device 305 which rejects the information carrier 107, e.g. pushes the information carrier 107 off the conveyor belt 110. The controller 303 may be for example a Programmable Logic Controller (PLC). The controller 303 and the image capturing device 105 may communicate with each other using a wireless communication line, a wired communication line, Ethernet, an Internet Protocol (IP) communication line etc. In another example, the image capturing device 105 sends instructions directly to the rejection device 305 without going via the controller 303. The rejection device 305 may be for example a robotic arm which is adapted to remove the information carrier 107 from the conveyor belt 110.

The instruction device 301 may be the device which may be adapted to send instructions to the industrial printer 101 to determine and print information. The instruction device 301 may also be the device which may send instructions to the image capturing device 105 to, based on the instructions sent to the industrial printer 101, determine, capture and possibly also verify the quality and accuracy of the print information in the captured image. As mentioned earlier, the instruction device 301 may for example determine a static part of the print information and the industrial printer 101 and the image capturing device 105 each determines the dynamic part of the print information.

Figure 4:
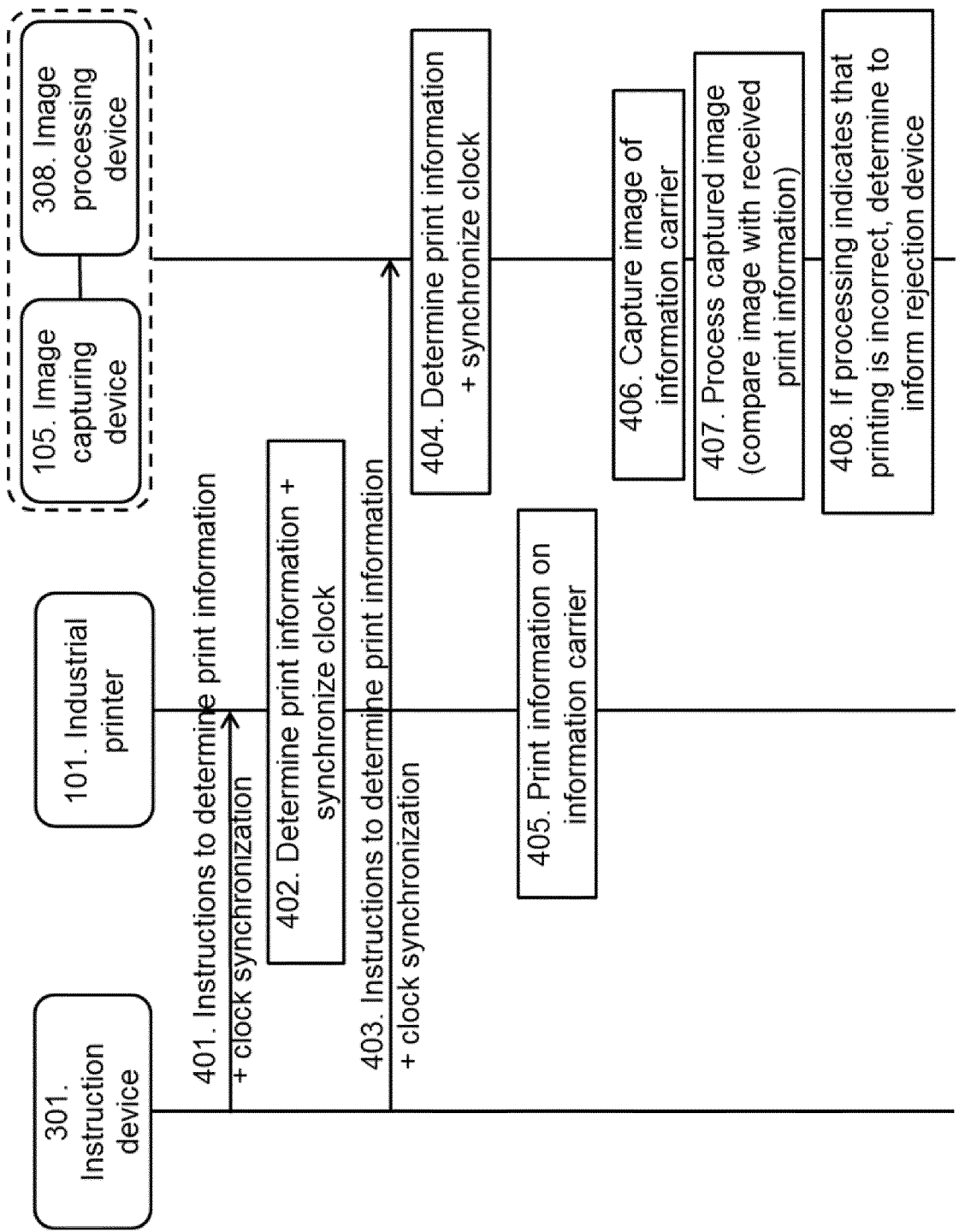
FIG. 4 is a signalling diagram illustrating embodiments of a method performed by a printer system.

FIG. 4 is a signalling diagram illustrating an example of handling of the printed information in the information carrier 107. The method is applicable to the embodiment where the image capturing device 105 and the image processing device 308 are collocated in one unit, and to the embodiment where the image capturing device 105 and the image processing device 308 are separate and standalone units. The method illustrated in FIG. 4 comprises at least some of the following steps, which steps may be performed in any suitable order than described below:

Step 401

The instruction device 301 sends instruction to the industrial printer 101 to dynamically determine the print information. In addition, the instruction device 301 may send clock synchronization information so that the clock comprised in the industrial printer 101 is time synchronized with the instruction device 301 and the image capturing device 105.

Step 402

This step corresponds to step 201 in FIG. 3. The industrial printer 101 dynamically determines the print information, as instructed. The industrial printer 101 may also synchronize its clock with the instruction device 301 and the image capturing device 105. The synchronization may also be performed with a time server, e.g. using a standard network time protocol.

Step 403

The instruction device 301 sends instructions to the image capturing device 105 to dynamically determine the print information. In addition, the instruction device 301 may send clock synchronization information so that the clock comprised in the image capturing device 105 is time synchronized with the instruction device 301 and the industrial printer 101.

In case the image capturing device 105 and the image processing device 308 are separate and standalone units, the image capturing device 105 may also send instructions to the image processing device 308 to dynamically determine the print information.

Step 404

The image capturing device 105 dynamically determines the print information, as instructed. The image capturing device 105 may also synchronize its clock with the instruction device 301 and the industrial printer 101. The synchronization may also be performed with a time server, e.g. using a standard network time protocol.

In case the image capturing device 105 and the image processing device 308 are separate and standalone units, the image capturing device 105 may send the dynamically determined print information to the image processing device 308 (this step is not illustrated in FIG. 4). In another embodiment, both the image capturing device 105 and the image processing device 308 may dynamically determine the print information. In yet another embodiment, the image processing device 308 may dynamically determine the print information instead of the image capturing device 105.

Step 405

Figure 1:
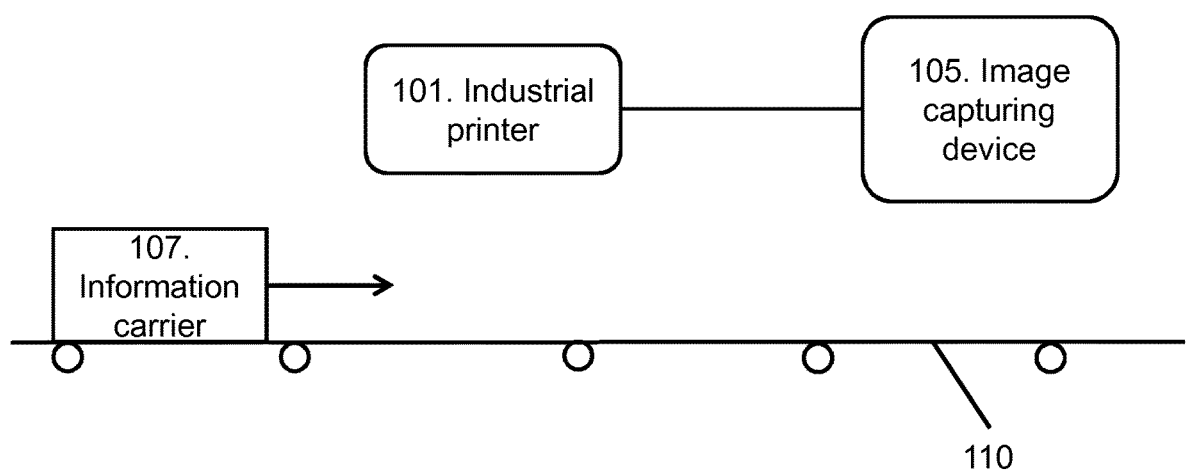
FIG. 1 is a schematic block diagram illustrating embodiments of a printer system.
Figure 2:
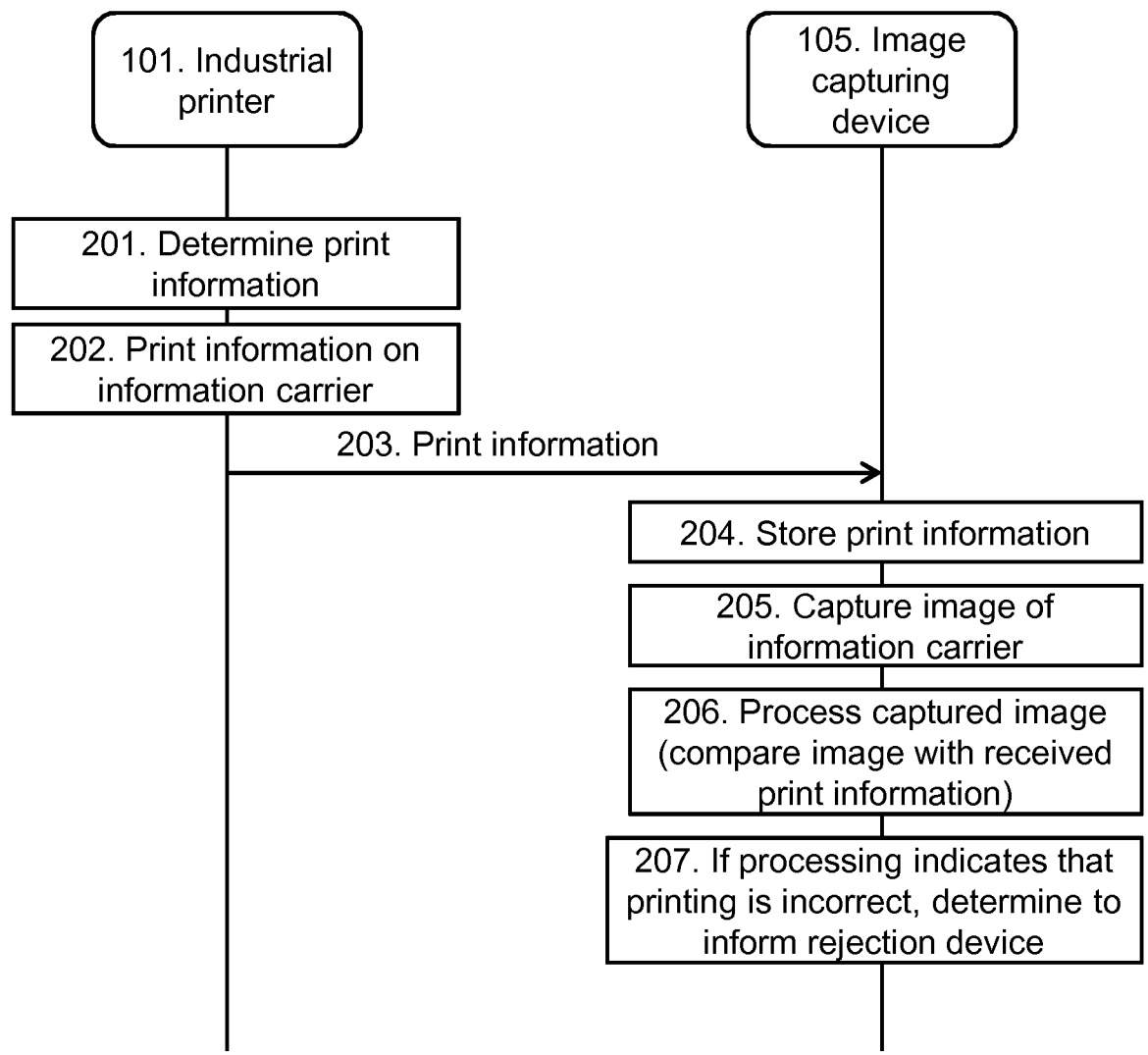
FIG. 2 is a signalling diagram illustrating embodiments of a method.

This step corresponds to step 202 in FIG. 2. The industrial printer 101 prints the determined print information on the information carrier 107. The printing may be triggered by a trigger. This step 405 may be performed after step 402, after step 403 or after step 404.

Step 406

This step corresponds to step 205 in FIG. 2. The image capturing device 105 captures an image of the print information on the information carrier 107. The image capturing may be triggered by a trigger.

Step 407

The image capturing device 105 may process the captured image, or it may send the captured image to the image processing device 308 (not illustrated in FIG. 4) for processing. The processing may be performed, regardless of being performed by the image capturing device 105 or the image processing device 308, by comparing the captured image with the determined information from step 404.

Step 408

If processing in step 407 (either performed by the image capturing device 105 or the image processing device 308) indicates that print information is incorrect, it may be determined that the rejection device 305 should be informed. The rejection device 305 may be informed directly by the image capturing device 105 or the image processing device 308, or it may be informed via the controller 303.

With the example method illustrated in FIG. 4, there is no need for any communication between the industrial printer 101 and the image capturing device 105.

The method for handling printed information on an information carrier 107 performed by the industrial printer 101 will now be described with reference to FIG. 5. The method illustrated in FIG. 5 comprises at least some of the following steps performed by the industrial printer 101, which steps may be performed in any suitable order than described below:

Step 501

This step corresponds to steps 401 and 402 in FIG. 4. For an information carrier 107, the industrial printer 101 dynamically determines at least part of the print information which is to be printed on the information carrier 107. The industrial printer 101 may determine this by calculating at least part of the print information using a suitable algorithm, or it may receive at least part of the print information from e.g. a print design device or an instruction device 301 and calculate the remaining part of the print information itself. The part of the print information which may be received from the print design device or the instruction device 301 may be the static part of the print information, i.e. the print information to be determined by the industrial printer 101 is the dynamic part of the print information.

Step 502

This step corresponds to step 405 in FIG. 4. The industrial printer 101 prints the determined print information on the information carrier 107. After step 502, the method goes back to step 501 for the next information carrier 107 in a batch.

Figure 6A:
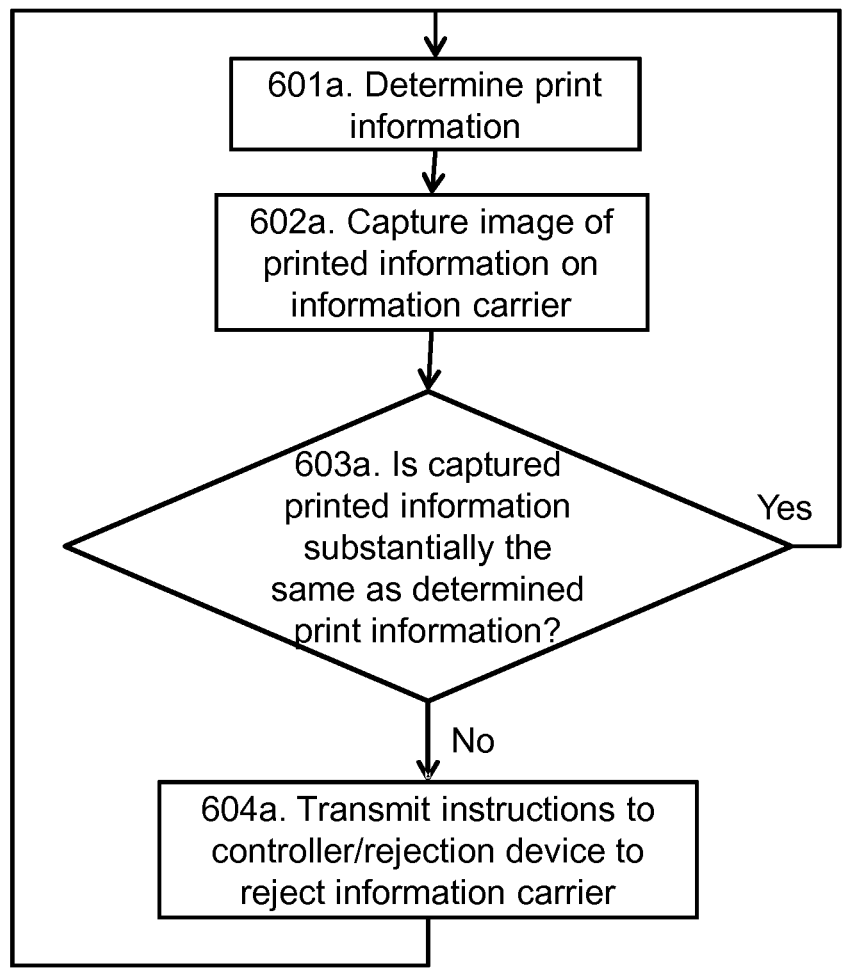
FIG. 6a is a flowchart depicting an example of a method performed by the image capturing device.
Figure 6B:
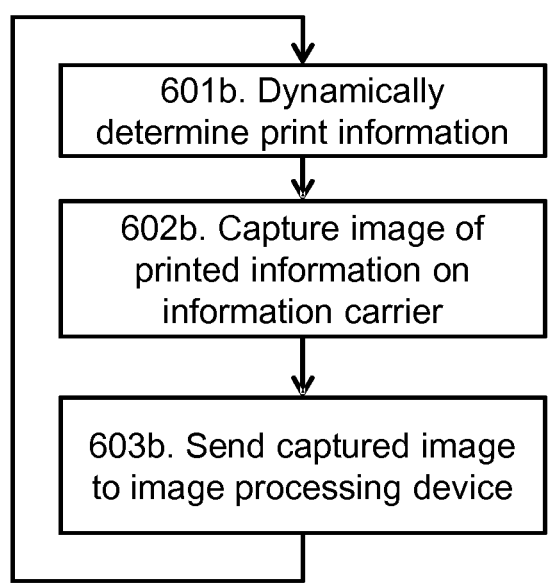
FIG. 6b is a flowchart depicting an example of a method performed by the image capturing device.

The method for handling printed information on an information carrier 107 performed by the image capturing device 105 will now be described with reference to FIG. 6*a* and FIG. 6*b*. FIG. 6*a* illustrates one example method performed by the image capturing device 105 and FIG. 6*b* illustrates another example method performed by the image capturing device 105. The method illustrated in FIG. 6*a* comprises at least some of the following steps performed by the image capturing device 105, which steps may be performed in any suitable order than described below:

Step 601*a*

This step corresponds to steps 403 and 404 in FIG. 4. The image capturing device 105 dynamically determines at least part of the print information which should be printed on the information carrier 107. The image capturing device 105 may determine this by using the same algorithm as the industrial printer 101 used in step 501 in FIG. 5. Thus, the image capturing device 105 has the same behaviour as the industrial printer 101 in term of dynamic information computation. The image capturing device 105 may determine this by calculating at least part of the print information using a suitable algorithm, or it may receive at least part of the print information from e.g. a print design device or an instruction device 301 and calculate the remaining part of the print information itself. The part of the print information which may be received from the print design device or the instruction device 301 may be the static part of the print information, i.e. the print information to be determined by the image capturing device 105 is the dynamic part of the print information.

Since the image capturing device 105 is able to determine the print information in the same way as the industrial printer 101 determines the print information, there is no need for any communication between the image capturing device 105 and the industrial printer 101 in order to send information. As a result of this, there is no problem regarding the image capturing device 105 being a device which works only in batch mode. The only communication between the image capturing device 105 and the industrial printer 101 may for example be related to clock synchronization.

The print information may be for example a shift code, an auto dating element, a counter, etc. The print information may be either in a standard format, customized format or encoded or calculated through an algorithm. The algorithm may be a mathematical expression or a computer algorithm.

The computation may be performed dynamically in that the information that changes from one instance to another or that it comprises a dynamical field which changes. For example when a serial number is to be printed on an item such as e.g. a mobile phone, the serial number is increased by one from one mobile phone to another mobile phone, it is dynamic. The serial number printed on one mobile phone may be 101 234 555 and the serial number printed on the next mobile phone may be increased by one to 101 234 556.

Some false rejections may occur if there is a time difference between the actions performed by the industrial printer 101 and the image capturing device 105 because the image is captured after the print information has been printed and not at the same time. In this case, some tolerance may be introduced when verifying whether the captured and the determined print information is substantially the same. It may be necessary to check for example the captured image at the current time, current time plus a predetermined amount of time and current time minus a predetermined amount of time. The predetermined amount of time may be for example 1 second, 1 minute etc.

The image capturing device 105 may receive instructions from e.g. the instruction device 301 to start determining the print information. Some parts of the print information may be comprised in the instructions, i.e. the parts of the print information which is static. Thus, the print information to be determined by the image capturing device 105 is the part which is dynamic and which is changing. The static part of the print information may also be provided by the instruction device to the printer 101.

The image capturing device 105 may determine the print information at the same time as the industrial printer 101 determines the print information in step 501, before or after the industrial printer 101 determines the print information in step 501. The image capturing device 105 needs to determine the print information before, after or in parallel to capturing the image of the print information. The image capturing device 105 needs to determine the print information at any suitable time before capturing the image in step 602*a*.

Step 602*a*

This step corresponds to step 205 in FIG. 3 and step 406 in FIG. 4. After the industrial printer 101 has performed its steps in FIG. 5 and when an information carrier 107 then comes in view of the image capturing device 105, the image capturing device 105 captures an image of the print information on the information carrier 107. For example, a serial number has been printed on a mobile phone 107 by the printer 101 in step 202 and is transported on a conveyor belt 110. When the mobile phone 107 is transported on the conveyor belt 110 and comes in view of the image capturing device 105, the image capturing device 105 captures an image of the print information on the mobile phone 107.

The image capturing device 105 may store the captured image e.g. in a memory device. The memory device may be comprised in the image capturing device 105 or it may be a standalone memory comprised in the printer system 300.

Step 603*a*

This step corresponds to step 407 in FIG. 4. In the example in FIG. 6*a*, the image capturing device 105 determines if the captured print information is substantially the same as determined print information, i.e. the print information determined by the image capturing device 105 in step 601*a*. This is done by that the image capturing device 105 compares the determined print information with the print information seen in the captured image. In other words, the image capturing device 105 controls the quality of the print information on the information carrier 107, where quality refers to whether the captured print information is correct or not.

If the captured print information is substantially the same as the print information, indicated with "yes" in FIG. 6*a*, the method proceeds to step 601*a*, i.e. to determine the print information on the next information carrier 107. Before proceeding to step 601*a* for the next information carrier 107, a value of a dynamic field in the print information may be updated.

If the captured print information is not substantially the same as the print information, indicated with "no" in FIG. 6*a*, the method proceeds to step 604*a*.

Considering an example where the determined print information, e.g. a serial number on a mobile phone 107 was determined to be 101 234 555 in step 601*a*. If the captured image also shows 101 234 555, the captured print information is the same as the determined print information and the image capturing device 105 has verified that the print information on the information carrier 107 is correct compared to what the industrial printer 101 was supposed to have printed.

If the captured image shows the serial number 101 234 600, the captured print information is not same as the determined print information which was 101 234 555. Thus, the image capturing device 105 has verified that the print information on the information carrier 107 is not correct compared to what the industrial printer 101 was supposed to have printed. In other words, something has gone wrong in the printing procedure performed by the industrial printer 101.

Step 604*a*

This step corresponds to step 408 in FIG. 4. This step is performed if the captured print information is not the same as the determined print information. In such scenario, the image capturing device 105 may send instructions to the controller 303 or to the rejection device 305 to reject the information carrier 107 which carries the incorrect captured print information. Rejection of the information carrier 107 may involve that the rejection device 305 removes the mobile phone 107 with the incorrect serial number from the conveyor belt 110. After step 604*a* has been performed, the method goes back to step 601*a*.

If the image capturing device 105 has stored a plurality of captured images, and detected that a plurality of captured images are not the same as the print information, the image capturing device 105 may inform the controller 303 that there is a major error somewhere in the printer system 300 and that the conveyor belt 110 should be stopped.

As mentioned above, FIG. 6*b* illustrates another example method performed by the image capturing device 105. A difference between the examples in FIG. 6*b* compared to FIG. 6*a* is that some of the method steps which were performed by the image capturing device 105 in step 6*a* are performed by an image processing device 308 in FIG. 6*b*. The method illustrated in FIG. 6*b* comprises at least some of the following steps performed by the image capturing device 105, which steps may be performed in any suitable order than described below:

Step 601*b*

This step corresponds to step 404 in FIG. 4 and step 601 in FIG. 6*a*. The image capturing device 105 dynamically determines at least part of the print information which should be printed on the information carrier 107. The image capturing device 105 may determine this by using the same algorithm as the industrial printer 101 used in step 501 in FIG. 5. Thus, the image capturing device 105 has the same behaviour as the industrial printer 101 in term of dynamic information computation. The image capturing device 105 may determine this by calculating at least part of the print information using a suitable algorithm, or it may receive at least part of the print information from e.g. a print design device or an instruction device 301 and calculate the remaining part of the print information itself. The part of the print information which may be received from the print design device or the instruction device 301 may be the static part of the print information, i.e. the print information to be determined by the image capturing device 105 is the dynamic part of the print information.

Since the image capturing device 105 is able to determine the printed information in the same way as the industrial printer 101, there is no need for any communication between the image capturing device 105 and the industrial printer 101 in order to send information. As a result of this, there is no problem regarding the image capturing device 105 being a device which works only in batch mode. The only communication between the image capturing device 105 and the industrial printer 101 may for example be related to clock synchronization.

The print information may be for example a shift code, an auto dating element, a counter, etc. The print information may be either in a standard format, customized format or encoded or calculated through an algorithm. The algorithm may be a mathematical expression or a computer algorithm.

The computation may be performed dynamically in that the information that changes from one instance to another or that it comprises a dynamical field which changes. For example when a serial number is to be printed on an item 107 such as e.g. a mobile phone 107, the serial number is increased by one from one mobile phone 107 to another mobile phone 107, it is dynamic. The serial number printed on one mobile phone 107 may be 101 234 555 and the serial number printed on the next mobile phone 107 may be increased by one to 101 234 556.

Some false rejections may occur if there is a time difference between the actions performed by the industrial printer 101 and the image capturing device 105 because image is captured after the print information has been printed and not at the same time. In this case, some tolerance may be introduced when verifying whether the captured and the determined print information is substantially the same. It may be necessary to check for example the captured image at the current time, current time plus a predetermined amount of time and current time minus a predetermined amount of time. The predetermined amount of time may be for example 1 second, 1 minute etc.

The image capturing device 105 may receive instructions from e.g. the instruction device 301 to start determining the print information. Some parts of the print information may be comprised in the instructions, i.e. the parts of the print information which is static. Thus, the print information to be determined by the image capturing device 105 is the part which is dynamic and which is changing. The static part of the print information may also be provided by the instruction device 301 to the printer 101.

The image capturing device 105 may determine the print information at the same time as the industrial printer 101 determines the print information in step 501, before or after the industrial printer 101 determines the print information in step 501. The image capturing device 105 needs to determine the print information before, after or in parallel to capturing the image of the print information. The image capturing device 105 needs to determine the print information at any suitable time before capturing the image in step 602a.

Step 602b

This step corresponds to step 205 in FIG. 2 and step 406 in FIG. 4 and step 602a in FIG. 6a. After the industrial printer 101 has performed its steps in FIG. 5 and when an information carrier 107 then comes in view of the image capturing device 105, the image capturing device 105 captures an image of the print information on the information carrier 107. For example, a serial number has been printed on a mobile phone 107 by the printer 101 in step 502 and is transported on a conveyor belt. When the mobile phone 107 is transported on the conveyor belt 110 and comes in view of the image capturing device 105, the image capturing device 105 captures an image of the print information on the mobile phone 107.

The image capturing device 105 may store the captured image e.g. in a memory device. The memory device may be comprised in the image capturing device 105 or it may be a standalone memory comprised in the printer system 300.

Step 603b

In the example in FIG. 6b, the image capturing device 105 sends the captured image to the image processing device 308. After sending the captured image to the image processing device 308, the image capturing device 105 proceeds to step 601b for the next information carrier 107.

The method for handling print information on an information carrier 107 performed by the image processing device 308 will now be described with reference to FIG. 7. The method illustrated in FIG. 7 comprises at least some of the following steps performed by the image processing device 308, which steps may be performed in any suitable order than described below:

Step 701

The image processing device 308 receives an image captured by the image capturing device 105. In case there are a plurality of image capturing devices 105 which each capture and image of the information carrier 107 in different angles, the image processing device 308 receives images from each of the plurality of image capturing devices 105.

The image processing device 308 may further receive the print information from the image capturing device 105. The captured image and the print information may be received in the same message from the image capturing device 105, or it may be received in separate messages at separate time instances. The image processing device 308 may store the captured image and the print information, e.g. in a memory unit. In another example, the image processing device 308 may obtain the print information from an external memory upon request.

Step 702

The image capturing device 105 determines if the captured print information is substantially the same as determined print information, i.e. the print information determined by the image capturing device 105 in step 601b. This is done by that the image capturing device 105 compares the determined print information with the print information seen in the captured image. In other words, the image capturing device 105 controls the quality of the print information on the information carrier 107, where quality refers to whether the captured print information is correct or not.

Figure 7:
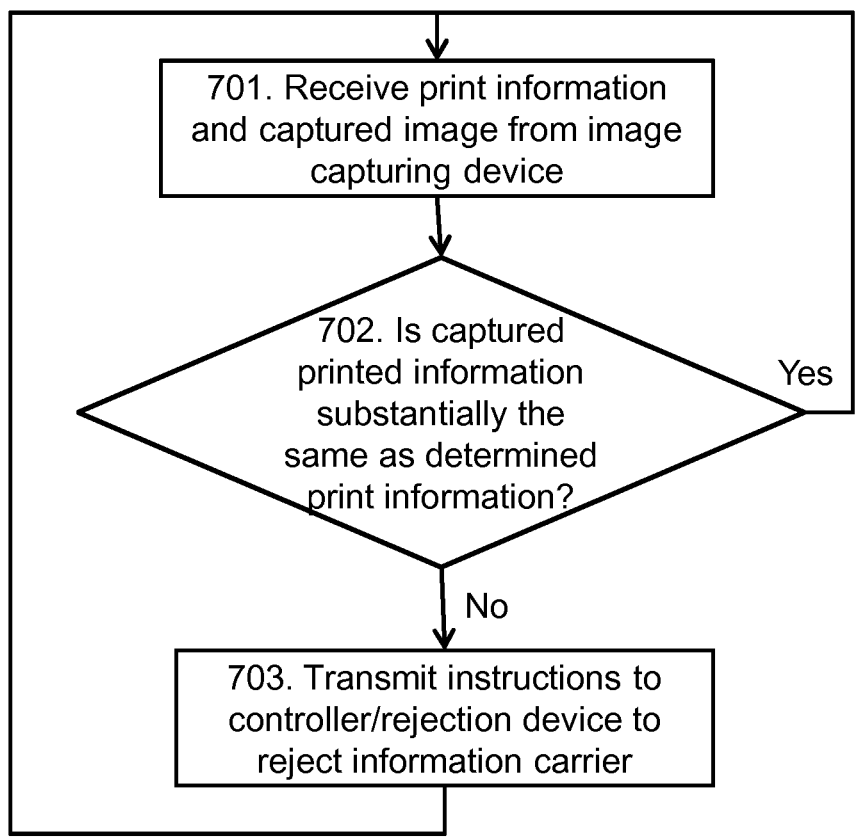
FIG. 7 is a flowchart depicting an example of a method performed by the image processing device.

If the captured print information is substantially the same as the print information, indicated with "yes" in FIG. 7, the method proceeds to step 701, i.e. to determine the print information on the next information carrier 107. Before proceeding to step 701 for the next information carrier, a value of a dynamic field in the print information may be updated.

If the captured print information is not substantially the same as the print information, indicated with "no" in FIG. 7, the method proceeds to step 703.

Considering an example where the determined print information, e.g. a serial number on a mobile phone 107 was determined to be 101 234 555 in step 601a. If the captured image also shows 101 234 555, the captured print information is the same as the determined print information and the image capturing device 105 has verified that the print information on the information carrier 107 is correct compared to what the industrial printer 101 was supposed to have printed.

If the captured image shows the serial number 101 234 600, the captured print information is not same as the determined print information which was 101 234 555. Thus, the image capturing device 105 has verified that the print information on the information carrier 107 is not correct compared to what the industrial printer 101 was supposed to have printed. In other words, something has gone wrong in the printing procedure performed by the industrial printer 101.

Step 703

This step is performed if the captured print information is not the same as the determined print information. In such scenario, the image capturing device 105 may send instructions to the controller 303 or to the rejection device 305 to reject the information carrier 107 which carries the incorrect captured print information. Rejection of the information carrier 107 may involve that the rejection device 305 removes the mobile phone 107 with the incorrect serial number from the conveyor belt 110. After step 703 has been performed, the method goes back to step 701.

If the image capturing device 105 has stored a plurality of captured images, and detected that a plurality of captured images are not the same as the print information, the image capturing device 105 may inform the controller 303 that there is a major error somewhere in the printer system 300 and that the conveyor belt 110 should be stopped.

Steps 701-703 in FIG. 7 are performed when the image capturing device 105 performs the method illustrated in FIG. 6b.

An example will now be described where the print information is a dynamic message based on time and date. For example, 70% of characters used in the print information may be dynamic and mainly based on the time and 30% of the characters may be static information which is not changed. The image capturing device 105 needs to learn to compute and update this print information in the same way as the industrial printer 101 does. The industrial printer 101 and the image capturing device 105 have each determined that the information that is to be printed on the information carrier is as follows: 43039876121030104203. The format of the print information to be verified in this example is YJJJFFFFLBMMDDHHMMCC, where:
Y=last digit of the year.
JJJ=number of the day in the year.
FFFF=number for the factory.
L=number for the line.
B=number for batch.
MM=current month.
DD=current day.
HH=current hour.
MM=current minute.
CC=counter from 01 to 99 on 2 digits incremented by 1 at each print.

The instruction device 301 may provide at least some of the following parts of the print information to the image capturing device 105:
4 factory digits FFFF.
Line number L.
Batch number B.

The factory digits, the line number and the batch number may be static data and they may be sent using a tag name such as e.g. StaticDataTag.

The instruction device 301 may also provide the initial value of the counter CC to the image capturing device 105. The initial value of the counter may for example be given the symbolic tag name CounterTag.

All the other elements of the print information may be computed by the image capturing device 105 according to the time. This determined print information may be referred to as dynamic information.

In this example, the print information which needs to be verified is composed of several parts based on time and date element. As the industrial printer 101 is printing the information before the image capturing device 105 is reading it, there may be some differences. In the best case only one digit (latest of time field) is impacted, but in the worst case for example 60% of the print information can be different when comparing the determined print information and the print information in the captured image. Since there is a time dependency, the possible clock difference between the printer 101 and the image capturing device 105 needs to be taken into account. In addition, as there is no direct communication between the industrial printer 101 (which knows exactly what it has printed) and the image capturing device 105 (which also knows exactly what should have been printed and which must verify it with a correct value), there may be some time difference between the print instance and the image capturing instance. For example, the industrial printer 101 may perform the printing at 10:42 h and the image capturing device 105 may capture the image at 10:43 h. The time difference may be even larger at 23:59 h because then the number of the day may change.

To handle the time difference, the image capturing device 105 may generate a plurality of possible alternatives of the print information according to its time. For example, three possible alternatives of the print information may be:
Print information based on the current time−1 minute.
Print information based on the current time.
Print information based on the current time+1 minute.

This print information computation must take the day, month and year changes and of course leap year into account.

The image capturing device 105 may compare the three possible alternatives of the print information with the print information in the captured image in order to verify the correctness of the print information in the captured image.

When the print information in the captured image is substantially the same as the determined print information, the image capturing device 105 may send a message to the controller 303 indicating that it should proceed with its tasks. If the controller 303 does not receive any message from the image capturing device 105, the controller 303 may activate a rejection system.

The image capturing device 105 may exchange some information such as e.g. the total number of reads, number of bad reads, etc. with the controller 303. This information exchange may be made through e.g. Ethernet or an IP protocol.

Figure 8:
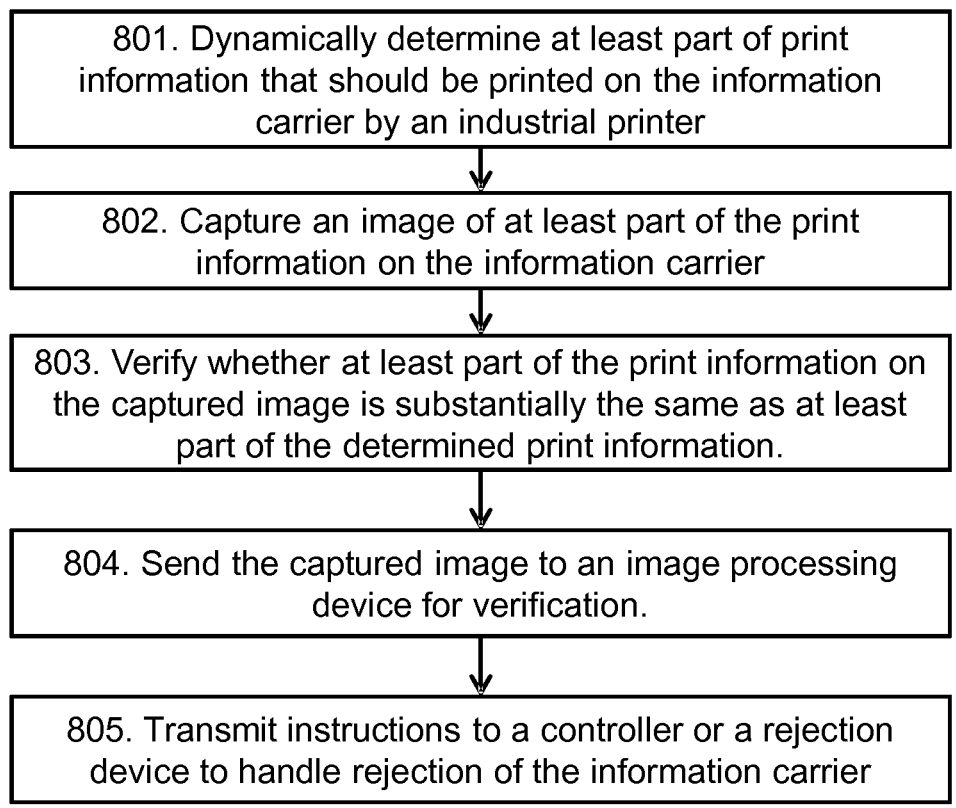
FIG. 8 is a flow chart illustrating an example of a method performed by the image capturing device.

The method described above will now be described seen from the perspective of the image capturing device 105. FIG. 8 is a flowchart describing the present method in the image capturing device 105, for handling printed information on an information carrier 107. The image capturing device 105 may be time synchronized with the industrial printer 101, a local time server or a global time server. The method comprises at least some of the following steps to be performed by the image capturing device 105, which steps may be performed in any suitable order than described below:

Step 801

This step corresponds to step 404 in FIG. 4, step 601a in FIG. 6a and step 601b in FIG. 6b. The image capturing device 105 dynamically determines at least part of the print information that should be printed on the information carrier 107 by an industrial printer 101.

The print information may be dynamically determined for a plurality of time instances.

The image capturing device 105 may dynamically determine the print information in the same way as the industrial printer 101 determines the print information. For example, they may use the same algorithm for determining the print information.

The at least part of the print information may be dynamic information which is changed between printing instances. The print information may be a date, a serial number, a time or a free text, and the print information may either be in a standard format, a customized format or encoded through an algorithm.

Step 802

This step corresponds to step 406 in FIG. 4, step 602a in FIG. 6a and step 602b in FIG. 6b. When the print information has been printed on the information carrier 107 by the industrial printer 101, the image capturing device 105 captures an image of at least part of the print information on the information carrier.

Step 803

This step corresponds to step 407 in FIG. 4 and step 603a in FIG. 6a. Step 803 may be an alternative to step 804, i.e. step 803 may be performed instead of step 804. The image capturing device 105 may verify whether at least part of the print information on the captured image is substantially the same as at least part of the determined print information.

The at least part of the print information on the captured image may be verified with respect to each of the determined plurality of time instances.

Step 804

This step corresponds to step 603b in FIG. 6b. Step 804 may be an alternative to step 803, i.e. step 804 may be performed instead of step 803. The image capturing device 105 may send the captured image to an image processing device 308 for verification. The image processing device 308 may receive the captured image.

Step 805

This step corresponds to step 408 in FIG. 4 and step 604a in FIG. 6a. The image capturing device 105 may transmit instructions to a controller 303 or a rejection device 305 to handle rejection of the information carrier 107 if at least part of the determined print information is not substantially the same as at least part of the print information on the captured image. The controller 303 or the rejection device 305 may receive the instructions.

Figure 9:
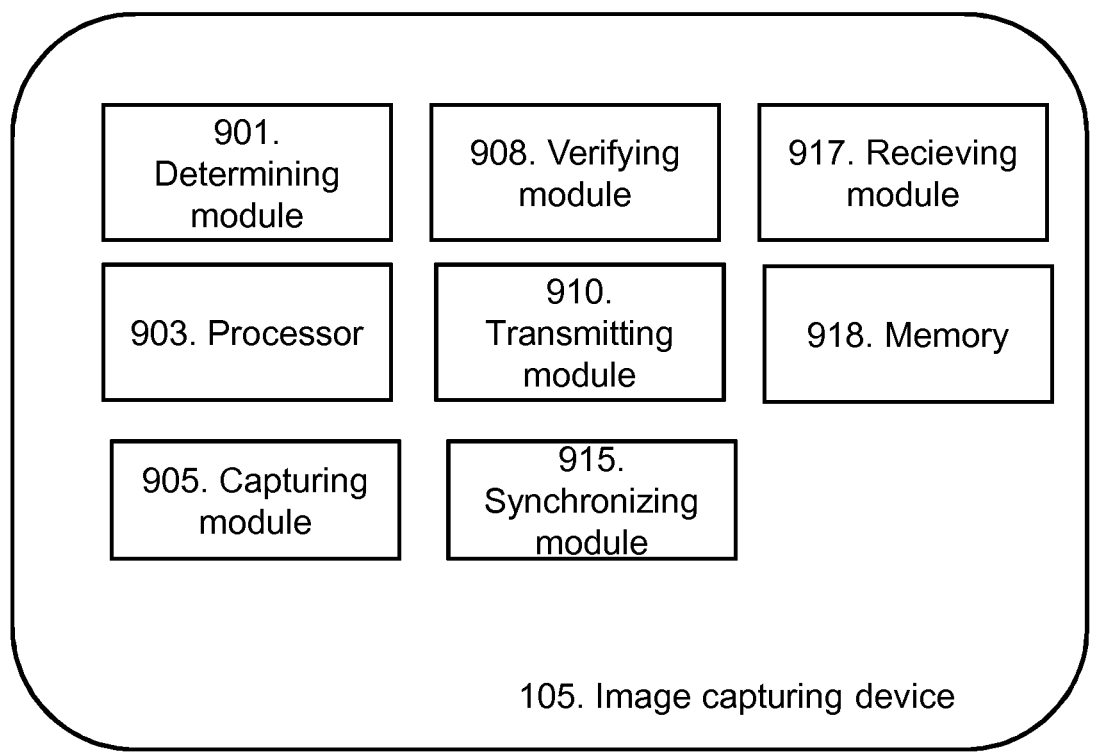
FIG. 9 is a schematic block diagram illustrating an example of the image capturing device.

To perform the method steps shown in FIGS. 4, 5, 6a, 6b, 7 and 8 for handling printed information on an information carrier 107, the image capturing device 105 may comprise an arrangement as shown in FIG. 9. To perform the method steps shown in FIGS. 4, 5, 6a, 6b, 7 and 8 for handling printed information on an information carrier 107, the image capturing device 105 is adapted to, e.g. by means of a determining module 901, dynamically determine at least part of print information that should be printed on the information carrier 107 by an industrial printer 101. The print information may be dynamically determined for a plurality of time instances. The at least part of the print information may be dynamic information which is changed between printing instances. The print information may be a date, a serial number, a time or a free text, and the print information may be either in a standard format, a customized format or encoded through an algorithm. The determining module 901 may also be referred to as a determining unit, a determining means, a determining circuit, means for determining, etc. The determining module 901 may be a processor 903 of the image capturing device 105.

The image capturing device 105 is further adapted to, e.g. by means of a capturing module 905, capture, when the print information has been printed on the information carrier 107 by the industrial printer 101, an image of the print information of at least part of the information carrier 107. The capturing module 905 may also be referred to as a capturing unit, a capturing means, a capturing circuit, means for capturing, etc. The capturing module 905 may be the processor 903 of the image capturing device 105.

The image capturing device 105 may be further adapted to, e.g. by means of a verifying module 908, verify whether at least part of the print information on the captured image is substantially the same as at least part of the determined print information. The verifying module 908 may also be referred to as a verifying unit, a verifying means, a verifying circuit, means for verifying, etc. The at least part of the print information on the captured image may be verified with respect to each of the determined plurality of time instances. The verifying module 908 may be the processor 903 of the image capturing device 105.

The image capturing device 105 may be further adapted to, e.g. by means of a transmitting module 910, send the captured image to an image processing device 308 for verification. The transmitting module 910 may also be referred to as a transmitting unit, a transmitting means, a transmitting circuit, means for transmitting, output unit etc. The transmitting module 910 may be a transmitter, a transceiver etc. The transmitting module 910 may be a wireless transmitter of the image capturing device 105.

The image capturing device 105 may be adapted to, e.g. by means of the determining module 901, dynamically determine the print information in the same way as the industrial printer 101 determines the print information.

The image capturing device 105 may be adapted to, e.g. by means of the transmitting module 910, transmit instructions to a controller 303 or a rejection device 305 to handle rejection of the information carrier 107 if at least part of the determined print information is not substantially the same as at least part of the print information on the captured image.

The image capturing device 105 may be adapted to, e.g. by means of a synchronizing module 915, be time synchronized with the industrial printer 101, a local time server or a global time server. The synchronizing module 915 may also be referred to as a synchronizing unit, a synchronizing means, a synchronizing circuit, means for synchronizing, etc. The synchronizing module 915 may be the processor 903 of the image capturing device 105.

The image capturing device 105 may be further adapted to, e.g. by means of a receiving module 917, receive information, images, data etc. from other modules in the image capturing device 105 and from other units in the printer system 300. The receiving module 917 may also be referred to as a receiving unit, a receiving means, a receiving circuit, means for receiving, input unit etc. The receiving module 917 may be a receiver, a transceiver etc. The receiving module 917 may be a wireless receiver of the image capturing device 105.

The image capturing device 105 may further comprise a memory 918 comprising one or more memory units. The memory 918 is arranged to be used to store data, received data streams, print information, time instances, captured images, verification information, dynamic information, threshold values, time periods, configurations, schedulings, and applications to perform the methods herein when being executed in the image capturing device 105. The memory 918 may comprise instructions executable by the processor 903.

The determining module 901, the capturing module 905, the verifying module 908, the transmitting module 910, the synchronizing module 915 and the receiving module 917 described above may refer to a combination of analog and digital circuits, and/or one or more processors configured with software and/or firmware, e.g. stored in a memory (e.g. the memory 918), that when executed by the one or more processors such as the processor 903 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

A first computer program may comprise instructions which, when executed on at least one processor, cause the at least one processor (e.g. the processor 903) to carry out the method according to any one of FIGS. 4, 5, 6a, 6b, 7 and 8. A first carrier may comprise the first computer program. The first carrier may be one of an electronic signal, optical signal, radio signal or computer readable storage medium.

Figure 10:
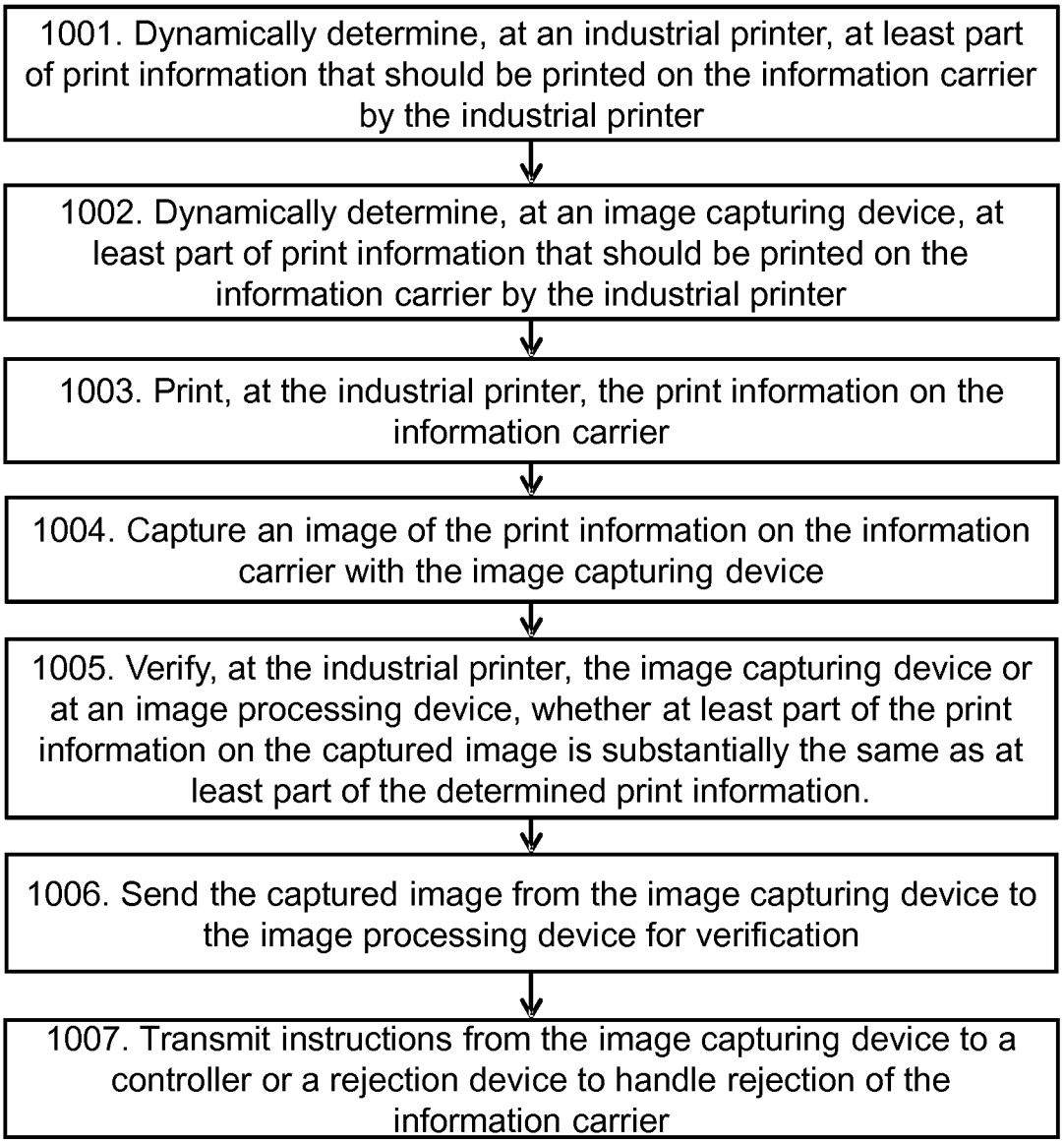
FIG. 10 is a flow chart illustrating an example of a method performed by the print system.

The method described above will now be described seen from the perspective of the printer system 300. FIG. 10 is a flowchart describing the present method in the printer system 300, for handling printed information on an information carrier 107. The method comprises at least some of the following steps to be performed by the printer system 300, which steps may be performed in any suitable order than described below:

Step 1001

Figure 5:
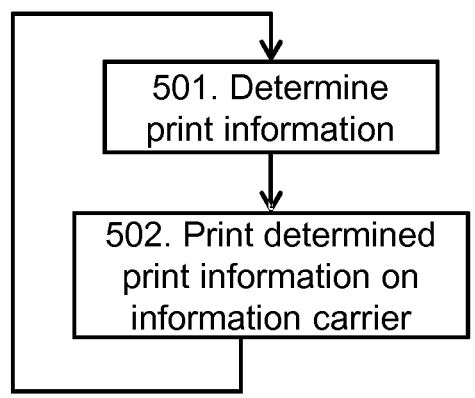
FIG. 5 is a flowchart depicting embodiments of a method performed by the industrial printer.

This step corresponds to step 402 in FIG. 4 and step 501 in FIG. 5. The industrial printer 101 dynamically determines at least part of print information that should be printed on the information carrier 107 by the industrial printer 101.

The print information may be dynamically determined for a plurality of time instances.

The image capturing device 105 may dynamically determine the print information in the same way as the industrial printer 101 may determine the print information.

The at least part of the print information may be dynamic information which is changed between printing instances.

The print information may be a date, a serial number, a time or a free text, and the print information may be either in a standard format, a customized format or encoded through an algorithm.

Step 1002

This step corresponds to step 404 in FIG. 4, step 601a in FIG. 6a, step 601b in FIG. 6b and step 801 in FIG. 8. The image capturing device 105 dynamically determines at least part of print information that should be printed on the information carrier 107 by the industrial printer 101. The image capturing device 105 may be time synchronized with the industrial printer 101, a local time server or a global time server.

Step 1003

This step corresponds to step 405 in FIG. 4 and step 502 in FIG. 5. The industrial printer 101 prints the print information on the information carrier 107.

Step 1004

This step corresponds to step 406 in FIG. 4, step 602a in FIG. 6a, step 602b in FIG. 6b and step 802 in FIG. 8. When the print information has been printed on the information carrier 107 by the industrial printer 101, the image capturing device 105 captures an image of the print information on the information carrier 107 with the image capturing device 105.

Step 1005

This step corresponds to step 407 in FIG. 4, step 603a in FIG. 6a, step 702 in FIG. 7 and step 803 in FIG. 8. The industrial printer 101, the image capturing device 105 or the image processing device 308 may verify whether at least part of the print information on the captured image is substantially the same as at least part of the determined print information.

The at least part of the print information on the captured image may be verified with respect to each of the determined plurality of time instances.

Step 1006

This step corresponds to step 603b in FIG. 6b, step 701 in FIG. 7a and step 804 in FIG. 8. The image capturing device 105 may send the captured image from the image capturing device 105 to the image processing device 308 for verification.

Step 1007

This step corresponds to step 408 in FIG. 4, step 604a in FIG. 6a and step 805 in FIG. 8. The image capturing device 105 may transmit instructions to a controller 303 or to a rejection device 305 to handle rejection of the information carrier 107 if at least part of the determined print information is not substantially the same as at least part of the print information on the captured image.

To perform the method steps shown in FIGS. 4, 5, 6a, 6b, 7, 8 and 10 for handling printed information on an information carrier 107, the industrial printer system 300 may comprise an arrangement as shown in FIG. 3.

To perform the method steps shown in FIGS. 4, 5, 6a, 6b, 7, 8 and 10 for handling printed information on an information carrier 107, the industrial printer system 300 is adapted to, e.g. by means of the industrial printer 101, dynamically determine at least part of print information that should be printed on the information carrier 107 by the industrial printer 101. The print information may be dynamically determined for a plurality of time instances. The at least part of the print information may be dynamic information which is changed between printing instances. The print information may be a date, a serial number, a time or a free text, and the print information may either be in a standard format, a customized format or encoded through an algorithm. The image capturing device 105 may be adapted to be time synchronized with the industrial printer 101, a local time server or a global time server.

The industrial printer system 300 is adapted to, e.g. by means of the image capturing device 105, dynamically determine at least part of print information that should be printed on the information carrier 107 by the industrial printer 101.

The industrial printer system 300 is adapted to, e.g. by means of the industrial printer 101, print the print information on the information carrier 107.

The industrial printer system 300 is adapted to, e.g. by means of the image capturing device 105, when the print information has been printed on the information carrier 107 by the industrial printer 101, capture an image of the print information on the information carrier 107.

The industrial printer system 300 may be adapted to, e.g. by means of the image capturing device 105, verify whether at least part of the print information on the captured image is substantially the same as at least part of the determined print information. The at least part of the print information on the captured image may be verified with respect to each of the determined plurality of time instances.

The industrial printer system 300 is adapted to, e.g. by means of the image capturing device 105, send the captured image from the image capturing device 105 to the image processing device 308 for verification.

The industrial printer system 300 may be adapted to, e.g. by means of the image capturing device 105, dynamically determine the print information in the same way as the industrial printer 101 determines the print information.

The industrial print system 300 may be adapted to, e.g. by means of the image capturing device 105, transmit instructions from the image capturing device 105 to a controller 303 or a rejection device 305 to handle rejection of the information carrier 107 if at least part of the determined print information is not substantially the same as at least part of the print information on the captured image.

A second computer program may comprise instructions which, when executed on at least one processor, cause the at least one processor to carry out the method according to any one of FIGS. 4, 5, 6a, 6b, 7, 8 and 10. A second carrier may comprise the second computer program. The second carrier may be one of an electronic signal, optical signal, radio signal or computer readable storage medium.

Summarized, the prior art problem of how to give to the image capturing device 105 the value of fields that must be checked without any communication between the industrial printer 101 and the image capturing device 105 has been overcome by the embodiments herein. In the embodiments herein, the image capturing device 105 is adapted to compute the dynamic fields of the print information in the same way as the industrial printer 101 does. To be able to do this, the image capturing device 105 is provided with sufficient knowledge and capacity to compute and update the values of each dynamic field when an image of the print information on an information carrier 107 is taken and processed by the image capturing device 105. With this, the integrity of the data is checked, i.e. that the print information is the correct data. There is no need for any modifications at the industrial printer 101, only at the image capturing device 105.

With the embodiments herein, it is possible to verify that the complete print information is present, that the print information is readable by the human eye and that the print information is coherent.

It should be noted that the word "comprising" does not exclude the presence of other elements or steps than those listed and the words "a" or "an" preceding an element do not exclude the presence of a plurality of such elements. It should further be noted that any reference signs do not limit the scope of the embodiments herein, that the embodiments may be implemented at least in part by means of both hardware and software, and that several "means", "units" or "devices" may be represented by the same item of hardware.

The various embodiments described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), Digital Versatile Discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments can be accomplished with standard programming techniques with rule-based logic and other logic to accomplish various database searching steps or processes, correlation steps or processes, comparison steps or processes and decision steps or processes. It should be noted that the words "component" and "module," as used herein and in the following example embodiments, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the various embodiments and with various modifications as are suited to the particular use contemplated. The features of the embodiments described herein may be combined in all possible combinations of methods, apparatus, modules, systems, and computer program products.

The invention claimed is:

1. A method for handling printed information on a plurality of information carriers printed by an industrial printer, the printed information for each information carrier including dynamic information that is different for at least one of the plurality of information carriers, the method comprising:
   receiving, by at least one processor, an initial input indicating an initial state of the dynamic information printed by the industrial printer, wherein the initial state of the dynamic information changes for at least one of the plurality of information carriers according to an algorithm programmed in each of the industrial printer and the at least one processor; and
   for each of the plurality of information carriers:
      determining, by the at least one processor, the dynamic information of the print information to be printed on the information carrier by an industrial printer based at least in part on the initial state of the dynamic information and the algorithm;
      receiving, by the at least one processor, a captured image of at least part of the print information on the information carrier from an image capturing device; and
      determining, by the at least one processor, whether the at least part of the print information on the captured image is correct based at least in part on the determined dynamic information.

2. The method according to claim 1, wherein determining whether the at least part of the print information on the captured image is correct comprises verifying whether a difference between the at least part of the print information on the captured image and the determined dynamic information is greater than a predetermined threshold.

3. The method according to claim 1, further comprising:
   capturing, by the image capturing device, the captured image, wherein the at least one processor is included in the image capturing device.

4. The method according to claim 2, wherein the dynamic information includes time information, and
   wherein receiving the initial input comprises receiving an initial time instance, whereby the time information of the dynamic information is derived based on the initial time instance and a clock signal.

5. The method according to claim 1, further comprising:
   for at least one information carrier, determining that the at least part of the print information on the captured image is incorrect; and transmitting instructions to a controller or a rejection device to handle rejection of the at least one information carrier in response to the determination.

6. The method according to claim 1, wherein the dynamic information is different for each of the plurality of information carriers.

7. The method according to claim 1, wherein the print information includes at least one of a date, a serial number, a time or a free text, and wherein the print information is either in a standard format, a customized format or encoded through an algorithm.

8. The method according to claim 1, wherein the image capturing device is time synchronized with the industrial printer, a local time server or a global time server.

9. A device for handling printed information on a plurality of information carriers printed by an industrial printer, the printed information for each information carrier including dynamic information that is different for at least one of the plurality of carriers, the device comprising at least one processor configured to:
receive an initial input indicating an initial state of the dynamic information printed by the industrial printer, wherein the initial state of the dynamic information changes for at least one of the plurality of information carriers according to an algorithm programmed in each of the industrial printer and the at least one processor; and
for each of the plurality of information carriers:
determine the dynamic information of the print information to be printed on the information carrier by an industrial printer based at least in part on the initial state of the dynamic information and the algorithm;
receive a captured image of at least part of the print information on the information carrier from an image capturing device; and
determine whether the at least part of the print information on the captured image is correct based at least in part on the determined dynamic information.

10. The device according to claim 9, wherein the at least one processor is configured to:
determine whether the at least part of the print information on the captured image is correct by verifying whether a difference between the at least part of the print information on the captured image and the determined dynamic information is greater than a predetermined threshold.

11. The device according to claim 9, further comprising the image capturing device, wherein the image capturing device is configured to:
capture the captured image; and
send the captured image to the at least one processor for verification.

12. The device according to claim 9, wherein the dynamic information includes time information, and
wherein the initial input comprises an initial time instance, wherein the at least one processor is configured to derive the time information of the dynamic information based on the initial time instance and a clock signal.

13. The device according to claim 9, wherein the at least one processor is configured to:
in response to determining that the at least part of the print information on a captured image is incorrect, transmit instructions to a controller or a rejection device to handle rejection of the at least one information carrier.

14. The device according to claim 9, wherein the dynamic information is different from each of the plurality of information carriers.

15. The device according to claim 9, wherein the print information includes at least one of a date, a serial number, a time or a free text, and wherein the print information is either in a standard format, a customized format or encoded through an algorithm.

16. The device according to claim 9, wherein the image capturing device is adapted to be time synchronized with the industrial printer, a local time server or a global time server.

17. A method performed by an industrial printer system for handling printed information on a plurality of information carriers, the printed information for each information carrier including dynamic information that is different for at least one of the plurality of carriers, the method comprising:
receiving, at each of an industrial printer and an image processing device, an initial input indicating an initial state of the dynamic information, wherein the initial state of the dynamic information changes for at least one of the plurality of information carriers according to an algorithm programmed in each of the industrial printer and the at least one processor; and
for each of the plurality of information carriers:
determining, at the industrial printer, the dynamic information to be printed on the information carrier by the industrial printer based on the initial state of the dynamic information and the algorithm;
determining, at the image processing device, the dynamic information to be printed on the information carrier by the industrial printer based on the initial state of the dynamic information and the algorithm, and independently of the determination by the industrial printer;
printing, at the industrial printer, the print information including the dynamic information on the information carrier;
receiving, at the image processing device, a captured image of the dynamic information on the information carrier from an image capturing device; and
determining, at the image processing device, whether the at least part of the print information on the captured image is correct based at least in part on the determined dynamic information.

18. An industrial printer system adapted to handle printed information on an information carrier, the industrial printer system comprising:
an industrial printer configured to:
receive an initial input from an instruction device, the initial input indicating an initial state of the dynamic information, wherein the initial state of the dynamic information changes for at least one of the plurality of information carriers according to an algorithm programmed therein; and
for each of the plurality of information carriers:
dynamically the dynamic information to be printed on the information carrier by the industrial printer based on the initial state of the dynamic information and the algorithm; and
print the print information including the dynamic information on the information carrier
an image processing device having the same algorithm programmed therein and configured to:
receive the initial input from the instruction device; and
for each of the plurality of information carriers:
determine the dynamic information to be printed on the information carrier by the industrial printer based on the initial state of the dynamic information and the algorithm, and independently of the determination by the industrial printer;

receive a captured image of the dynamic information on the information carrier from an image capturing device; and determine whether the at least part of the print information on the captured image is correct based at least in part on the determined dynamic information.

19. The method according to claim 1, wherein determining the dynamic information of the print information comprises predicting the dynamic information of the print information that should be printed on the information carrier without analyzing any print information printed on the information carrier.

20. The device according to claim 9, wherein the at least one processor is configured to, for each of the plurality of information carrier, determine the dynamic information of the print information by predicting the dynamic information of the print information that should be printed on the information carrier without analyzing any print information printed on the information carrier.

\* \* \* \* \*